(12) United States Patent
Shapiro et al.

(10) Patent No.: US 11,460,828 B2
(45) Date of Patent: Oct. 4, 2022

(54) MULTI-USER COMPUTER-NUMERICALLY-CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Scott Haug, Seattle, WA (US); Linden Wright, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 0 days.

(21) Appl. No.: 17/013,290

(22) Filed: Sep. 4, 2020

(65) Prior Publication Data

US 2020/0409335 A1    Dec. 31, 2020

Related U.S. Application Data

(63) Continuation of application No. 15/823,509, filed on Nov. 27, 2017, now Pat. No. 10,802,465.
(Continued)

(51) Int. Cl.
*G05B 19/4068* (2006.01)
*G05B 19/4063* (2006.01)
(Continued)

(52) U.S. Cl.
CPC ....... *G05B 19/4068* (2013.01); *G05B 19/409* (2013.01); *G05B 19/4063* (2013.01);
(Continued)

(58) Field of Classification Search
CPC ............ G05B 19/4068; G05B 19/4063; G05B 19/409; G06F 3/048; G06F 21/305
See application file for complete search history.

(56) References Cited

U.S. PATENT DOCUMENTS 3,721,811 A    3/1973  Taylor et al.
3,967,176 A    6/1976  Wagener et al.
(Continued)

FOREIGN PATENT DOCUMENTS

CN    101095033 A    12/2007
CN    101733558 A     6/2010
(Continued)

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. Retrieved on May 10, 2016. pp. 1-10.
(Continued)

*Primary Examiner* — Mohammad Ali
*Assistant Examiner* — Vincent W Chang
(74) *Attorney, Agent, or Firm* — Lee Sullivan Shea & Smith LLP

(57) ABSTRACT

A method for accessing a computer-numerically-controlled machine can include receiving a command to be executed by the computer-numerically-controlled machine. A hardware state of a component in the computer-numerically-controlled machine can be determined by receiving, from the component, data indicative of the hardware state. An origin of the command including a user identification of a user who sent the command and/or a machine identification of a device that sent the command can be determined. Whether the computer-numerically-controlled machine is allowed to execute the command can be determined by applying a set of rules and based on the hardware state and/or the origin of the command. In response to determining that the computer-numerically-controlled machine is allowed to execute the command, the command can be executed at the computer-numerically-controlled machine.

20 Claims, 11 Drawing Sheets

Related U.S. Application Data

(60) Provisional application No. 62/426,432, filed on Nov. 25, 2016.

(51) Int. Cl.
  *G05B 19/409* (2006.01)
  *G06F 3/048* (2013.01)
  *G06F 21/30* (2013.01)

(52) U.S. Cl.
  CPC ............ *G06F 3/048* (2013.01); *G06F 21/305* (2013.01); *G05B 2219/36531* (2013.01); *G05B 2219/36542* (2013.01); *G05B 2219/45165* (2013.01)

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,420,675 B1 | 7/2002 | Lizotte et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,005,606 B2 | 2/2006 | Legge et al. |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,912,915 B2 | 3/2018 | Sinclair |
| 9,987,798 B2 | 6/2018 | Tyler |
| 10,052,822 B1* | 8/2018 | Sait ....................... B33Y 50/02 |
| 10,234,260 B2 | 3/2019 | Siercks et al. |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2008/0058734 A1 | 3/2008 | Hanft et al. |
| 2008/0149604 A1 | 6/2008 | Varriano-Marston et al. |
| 2008/0160254 A1 | 7/2008 | Arnold |
| 2008/0243299 A1 | 10/2008 | Johnson et al. |
| 2008/0249653 A1 | 10/2008 | Ichikawa |
| 2009/0120914 A1 | 5/2009 | Lawrence |
| 2009/0250445 A1 | 10/2009 | Yamaguchi et al. |
| 2009/0308851 A1 | 12/2009 | Harnisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0262590 A1* | 10/2010 | Holt .................... G06F 8/456 707/704 |
| 2010/0274379 A1 | 10/2010 | Hehl |
| 2010/0301023 A1 | 12/2010 | Unrath et al. |
| 2011/0127333 A1 | 6/2011 | Veksland et al. |
| 2011/0193943 A1 | 8/2011 | Campbell |
| 2011/0316977 A1 | 12/2011 | Pienaar |
| 2012/0035745 A1 | 2/2012 | Mori et al. |
| 2012/0109590 A1* | 5/2012 | Trainer ................. G06F 30/00 703/1 |
| 2012/0117787 A1 | 5/2012 | Sun et al. |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0032706 A1* | 1/2014 | Kuscher ............... G06F 9/4856 709/217 |
| 2014/0039707 A1 | 2/2014 | Curtis et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0268607 A1 | 9/2014 | Wicker et al. |
| 2014/0310122 A1 | 10/2014 | Danielson et al. |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0154453 A1 | 6/2015 | Wilf |
| 2015/0158311 A1 | 6/2015 | Ogasawara et al. |
| 2015/0212421 A1 | 7/2015 | deVilliers et al. |
| 2015/0245549 A1 | 8/2015 | Kurita et al. |
| 2015/0355621 A1 | 12/2015 | Ikeda et al. |
| 2015/0378348 A1 | 12/2015 | Gupta et al. |
| 2016/0059371 A1 | 3/2016 | Chang et al. |
| 2016/0084649 A1 | 3/2016 | Yamazaki et al. |
| 2016/0147213 A1 | 5/2016 | Murakami |
| 2016/0156771 A1 | 6/2016 | Lee |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0360409 A1 | 12/2016 | Singh |
| 2017/0045877 A1 | 2/2017 | Shapiro et al. |
| 2017/0045879 A1 | 2/2017 | Yang et al. |
| 2017/0057008 A1 | 3/2017 | LIU et al. |
| 2017/0123362 A1 | 5/2017 | Masui et al. |
| 2017/0173888 A1* | 6/2017 | Thomas-Lepore .. H04N 1/4433 |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147657 A1 | 5/2018 | Shapiro |
| 2018/0147658 A1 | 5/2018 | Shapiro |
| 2018/0147659 A1 | 5/2018 | Shapiro |
| 2018/0150047 A1 | 5/2018 | Shapiro |
| 2018/0150055 A1 | 5/2018 | Shapiro |

(56) References Cited

U.S. PATENT DOCUMENTS

| | | |
|---|---|---|
| 2018/0150058 A1 | 5/2018 | Shapiro |
| 2018/0150062 A1 | 5/2018 | Shapiro |
| 2019/0058870 A1 | 2/2019 | Rowell et al. |
| 2019/0278250 A1 | 9/2019 | Clement et al. |
| 2019/0310604 A1 | 10/2019 | Shapiro et al. |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214058 A1 | 1/2016 |
| EP | 0954125 A2 | 11/1999 |
| EP | 1309108 A1 | 5/2003 |
| EP | 2471625 A2 | 7/2012 |
| EP | 2808123 A1 | 12/2014 |
| JP | H03 254380 A | 11/1991 |
| JP | 04244347 A | 9/1992 |
| JP | 2002123306 A | 4/2002 |
| WO | WO-94/03302 A1 | 2/1994 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA. 2010 IEEE.* May 11, 2010. pp. 445-448.
International Search Report and Written Opinion issued in International Application No. PCT/US2017/063190, dated May 3, 2018 (May 3, 2018). 18 pages.

* cited by examiner

MULTI-USER COMPUTER-NUMERICALLY-CONTROLLED MACHINE

CROSS REFERENCE TO RELATED APPLICATION

This application is a Continuation of application Ser. No. 15/823,509 filed on Nov. 27, 2017, entitled "MULTI-USER COMPUTER-NUMERICALLY-CONTROLLED MACHINE," which claims the benefit of U.S. Provisional Application 62/426,432 filed on Nov. 25, 2016, entitled "MULTI-USER COMPUTER-NUMERICALLY-CONTROLLED MACHINE," the disclosures of which are incorporated herein by reference in their entirety.

TECHNICAL FIELD

The subject matter described herein relates to software configurations for accommodating multiple users of a computer-numerically-controlled machine.

BACKGROUND

Computer-numerically-controlled (CNC) machines can be configured to be used by one user, but also by multiple users. Multiple users can have various accounts and permission levels that can define when and how a user can use a CNC machine. A CNC machine can also be connected to a network, such as the internet, and receive commands from multiple users at remote locations.

SUMMARY

In one aspect, a method includes selectively allowing, at a computer-numerically-controlled machine including a laser configured to deliver electromagnetic energy to effect a change in a material within an interior space of the computer-numerically-controlled machine, a command to be executed by the computer-numerically-controlled machine. The selectively allowing includes determining a hardware state of a component in the computer-numerically-controlled machine by at least receiving, from the component, data describing the hardware state. Also, the selectively allowing includes identifying an origin of the command. The origin of the command has a user identification of a first user that sent the command and/or a machine identification of a device that sent the command. The command is executed at the computer-numerically-controlled machine when the determining and the identifying are allowed based on a comparison, of the hardware state and the origin of the command, with a set of rules defining when the computer-numerically-controlled machine is allowed to execute the command.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, users can have different levels of permissions that can restrict access to what commands they can issue on a CNC machine. Administrators or cloud-based control software can allow or restrict lower-level user's degree of access. This can, among other things, prevent accidents from unskilled users, prevent theft of items in the CNC machine, prevent simultaneous issuing of commands, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a multi-user computer-numerically-controlled machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
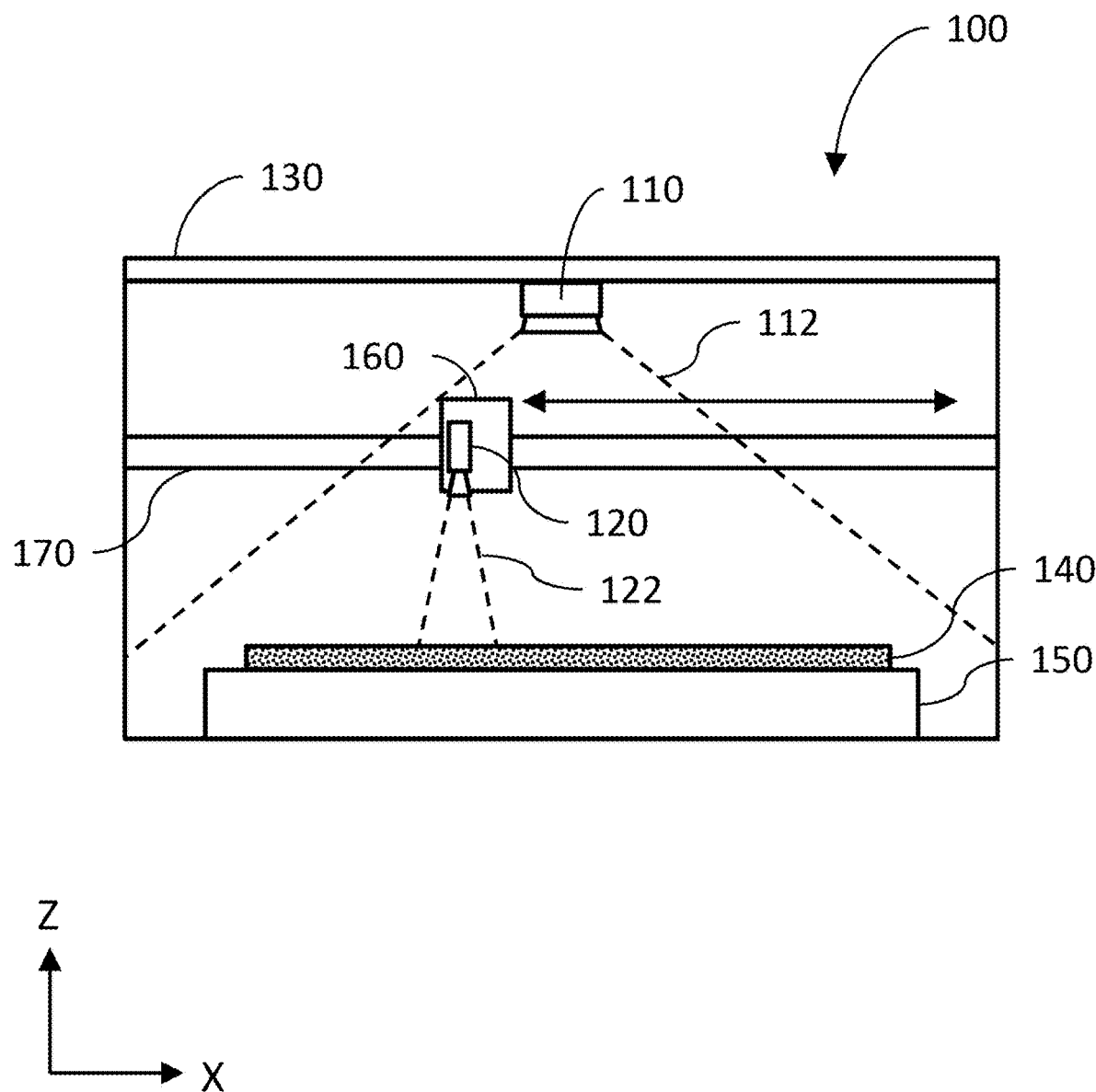
FIG. 1 is an elevational view of a CNC machine with a camera positioned to capture an image of the entire material bed and another camera positioned to capture an image of a portion of the material bed, consistent with some implementations of the current subject matter.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer-numerically-controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
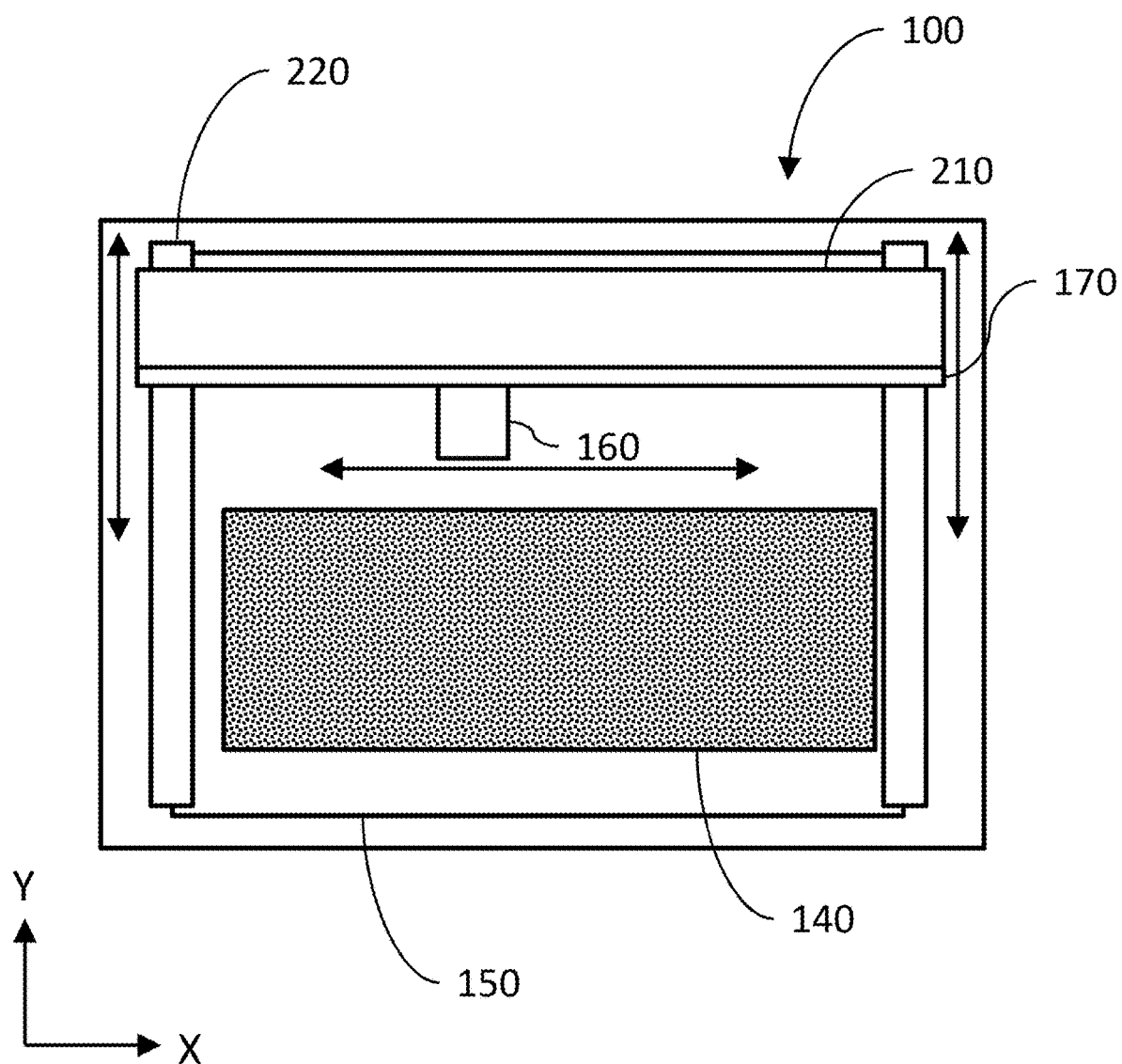
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

Figures 3A, 3B, 3C:
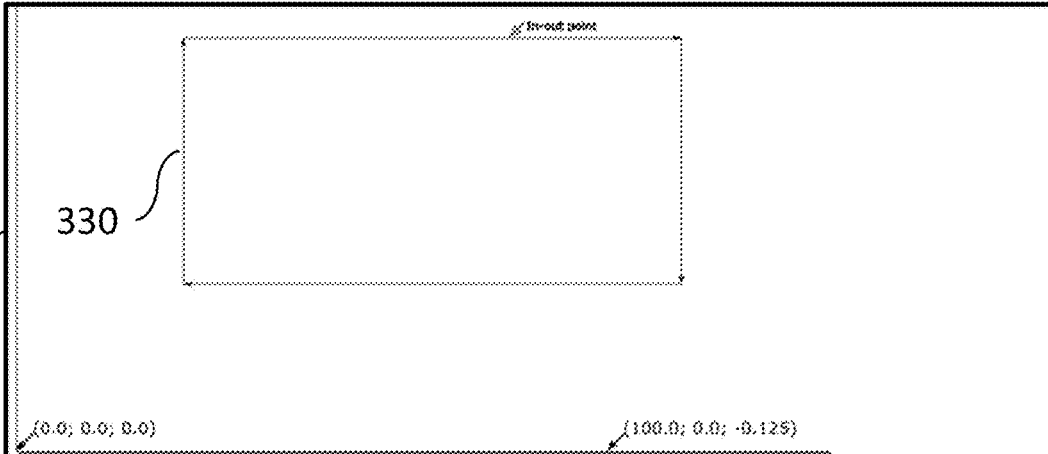
FIG. 3A is a diagram illustrating one example of an SVG source file, consistent with some implementations of the current subject matter.
FIG. 3B is an example of a graphical representation of the cut path in the CNC machine, consistent with some implementations of the current subject matter.
FIG. 3C is a diagram illustrating the machine file corresponding to the cut path and the source file, consistent with some implementations of the current subject matter.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
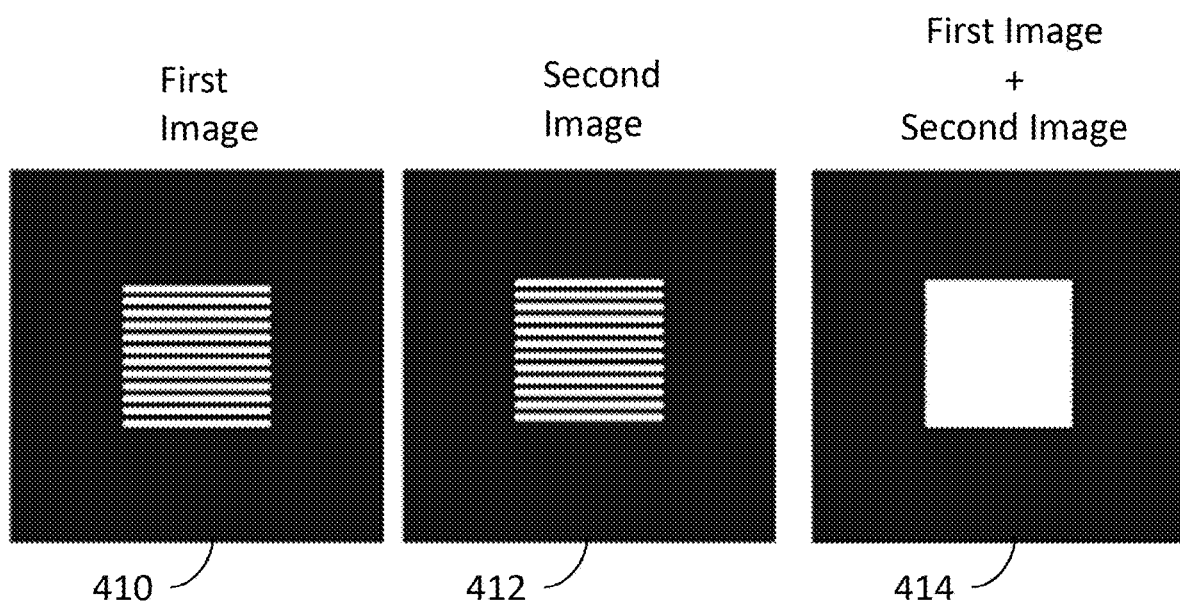
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
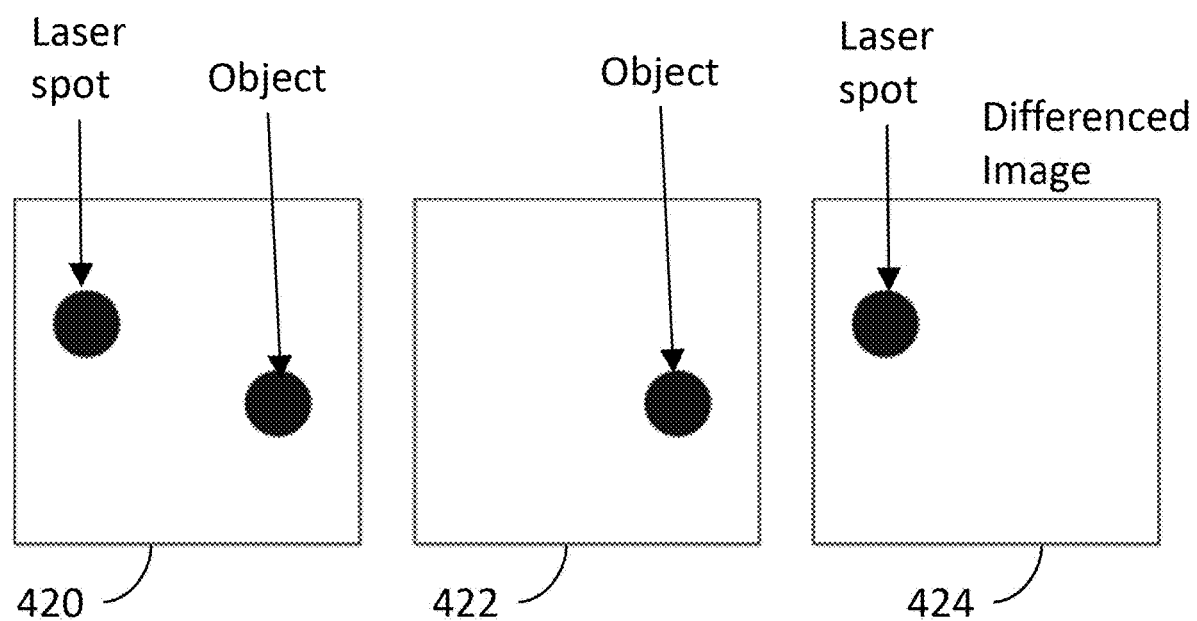
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
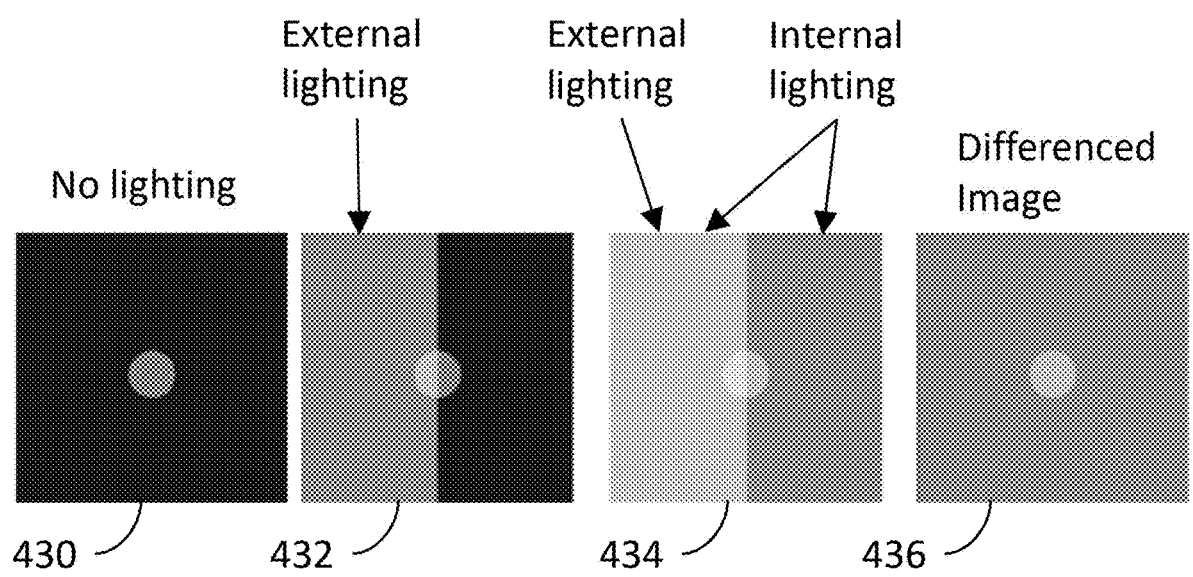
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $\frac{1}{60}^{th}$ of a second, or less than $\frac{1}{120}^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Network Configuration

Figure 5:
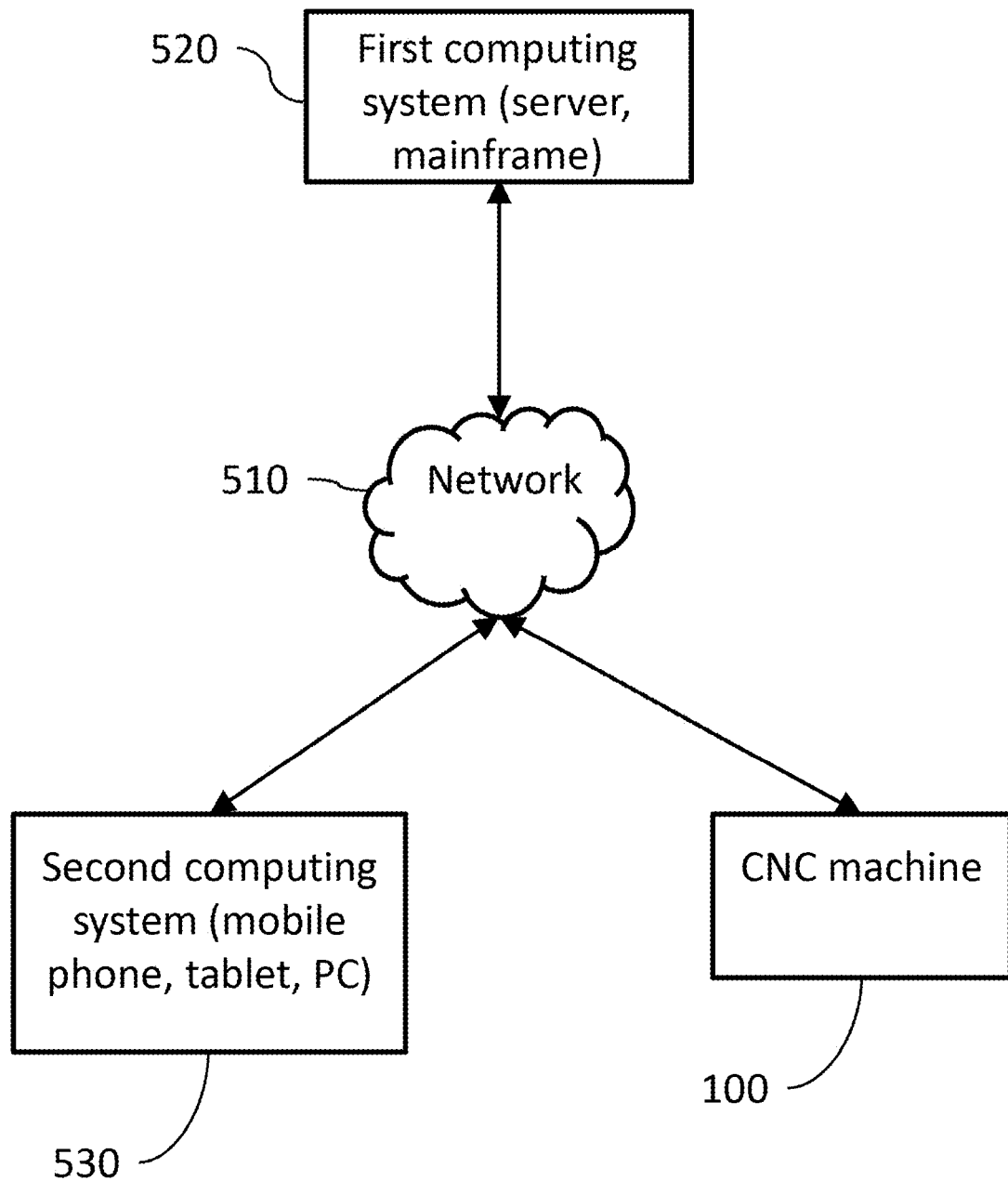
FIG. 5 is a diagram illustrating a cloud-based system supporting operation of a CNC machine, consistent with some implementations of the current subject matter.

FIG. 5 is a diagram illustrating a cloud-based system supporting operation of a CNC machine 100, consistent with some implementations of the current subject matter. By taking the most computationally expensive steps in the process described herein and distributing them over a network 510 to distributed computers, several advantages can be realized. The cloud-based system can include any number or combinations of first computing systems 520 (servers, mainframes, etc.) to provide powerful computation services. There can also be smaller second computing systems 530, for example, mobile phones, tablet computers, personal computers, etc. where users can access and interact with the system. Both the first computing system 520 and the second computing system 530 can be connected by the network 510 to each other and to any number of CNC machines. The network 510 can be a wired or wireless network.

One User to Many CNC Machines

A pattern, source file, or other selection of operations to be executed by the CNC machine 100 can be initiated from a remote computer. The remote computer can be, for example, the first computing system 510, second computing system 520, or a computer local to the CNC machine 100. A list of available CNC machines can be provided by a server to the user of the remote computer to allow the user to select a desired CNC machine 100 for their project. Other graphical user interfaces (GUI's) can be provided by the server to the user of the remote computer to enable selection and use of connected CNC machines. Patterns, associated source files, and/or motion plans can also be stored on the server in a database. If desired, these or similar resources can be referenced by the user or the system instead of requiring that all the files and calculations be generated from scratch.

Some implementations can include applications such as one user spreading processing activities across multiple machines at any given time to process multiple projects. For example, a design may make it necessary to process multiple pieces of material to complete the design. The user can insert multiple pieces of material into separate CNC machines, and then send one process to each CNC machine simultaneously, exploiting the access to multiple machines to reduce overall processing time.

To accomplish this, the user can divide a project into multiple steps, each step of which is a separate processing operation requiring a separate motion plan. The user can then, instead of sending them sequentially to a single CNC machine, assign them to different CNC machines. The system can then generate separate motion plans, one for each CNC machine used. Each motion plan can be based at least on, for example, the physical constraints of the target CNC machine, for example maximum tool speed, and can have additional constraints such as the size or type of material loaded or intended to be loaded into that particular CNC machine. Finally, each motion plan can be sent to its corresponding CNC machine, and the motion plans executed on their respective CNC machines.

Many Users to One CNC Machine

A single CNC machine 100 can be accessed or controlled by multiple users. In some implementations, a group of users can transmit motion plans to the CNC machine 100. The motion plans can be executed in sequence on different pieces of material 140 and/or executed in sequence on the same piece of material 140. In other implementations, the motion plans from different users can also be combined into a single motion plan, for example in order to optimize tool routing by machining adjacent elements from different users consecutively. Here, conflicts between the different motion plans can be tested. For instance, the conflict testing can be performed at the CNC machine 100, at a local computer on which the motion plan was generated, on a local computer to which the motion plan was downloaded (e.g., from a server, another computer, and/or the like), at an intermediate server, and/or the like.

In any of the implementations described herein, the user (or users) can be contacted by the server, for example, to inform them that the CNC machine 100 needs attention, that an operation is completed, to provide updates as to the status of their project, etc. The form of contact can be, for example, text messages, mobile phone calls, email, mobile app notifications, etc. The decision of which user that the CNC machine contacts can be based on rules, for example, notifying an "administrator" but not notifying a "guest," notifying the user whose job was just completed, one time instructions such as a user requesting to be notified when a particular job completes or when the tool is idle, or other parameters.

Adding Users with Appropriate Permission Levels for CNC Machine Access

Account set-up for users requiring access to at least one CNC machine can be achieved via different approaches that may benefit from being tailored towards the setting of use of the CNC machine. For example, restricted use access or settings that restrict at least one component of utility, may be appropriate in environments that includes at least some untrusted users including, for example, maker-spaces, educational institutions, kiosks, product demonstrations situations, and/or the like. Conversely, unrestricted or less-restricted access may be desirable for an environment where all users are mutually trusting or where reduced management and coordination overhead is desired (e.g. small office and home use).

As used herein, the terms "administrator," "guest," and/or the like are intended to refer to roles in which some users have full permissions ("administrators") and some have limited permissions ("guests"). These roles and permissions described herein are examples and not intended to be exclusory or limiting.

Invitation-Only Account Access

In some implementations, account set-up can be achieved via an invitation process, whereby a user, for example only a user with special permissions, can authorize an invitation to be sent to a new user, prompting use permissions to be assigned by the administrative user or selected by the new user, as appropriate. The set of permissions assigned to a user can be customizable to the setting of use, and may be optimized for such variables as the required level of privacy and security, skill-level, experience of the user, need for the user to perform administrative tasks, and the like.

Guest Account Access

In other implementations, guest accounts can be employed by systems requiring some level of public or common access to one or more CNC machines. Authorization of guests to at least one public or shared access CNC machine can be achieved by connecting to the machine and, optionally, providing some level of interaction: entering a guest password, entering a passcode, agreeing to terms and conditions, some indicator of proximity such as GPS coordinates or ability to receive a short-range signal such as Bluetooth or Near-Field Communications, or by being on the same wired or wireless local area network as the machine, for example.

Permissions

Sensor permissions can be applied to users of a CNC machine that contains at least one sensor such as a camera, microphone, and/or another device that capture data from the machine and/or its surroundings, including any material in the CNC machine. In the example of a camera, restrictions may be desirable such as only allowing certain users to access the control of or output from the camera, only allowing permitting camera data to be accessed when there is nothing in the material bed; restricting camera access during a cut and/or after the cut until the material is removed, only allowing a user access to the camera when the CNC machine or other connected computer has received confirmation that the user is in some way actively engaged with the CNC machine such as sending it a motion plan for execution, disallowing camera access when the camera is pointed outwards towards the room, only allowing user access to the camera when a user is monitoring an operation they own or initiated, allowing or prohibiting users to download camera data (e.g. photo or video), allowing or prohibiting users to post the data live in public or private, and so on. Sensor permissions can also be applied to other sensor data such as microphone data, temperature data, vibration data, laser parameter data, or the like.

Job management permissions can be applied to users of a CNC machine to, for example, allow or prohibit sending jobs to the CNC machine, observe who has submitted pending jobs, observe the contents of pending jobs, enable the CNC machine to begin the job (this can be a separate step from sending the job, as in implementations where a physical action on the CNC machine, such as entering a PIN code or pushing a button, is required), submitting a job for approval by a different user before execution, or the like.

Allocation of Access and Permissions

Access and permissions can be allocated through a variety of means. Permissions can be granted by physical access, for example requiring the user to push a button on the machine to activate their account with access to the machine. Permissions can be granted by the machine's distributor or retailer, for example by authorizing the purchaser's email address or pre-existing account to connect to the machine. Permissions can be granted by other users, for example users who have 'administrator' permissions or 'user account manager' positions. Permissions may be granted by knowledge of a unique secret, for example a password that allows the machine owner to access the machine as an administrator. Permissions can be granted to all and then locked down, for example a machine that initially grants every user full administrative permissions, but allows administrators to then restrict the granting of further permissions. Permissions may be granted on a temporary or permission-by-permission basis, or the user can be assigned a role with certain permissions assigned based on the role. Any or all of these may be used alone or in combination, and are intended only as examples.

A variety of access and permissions settings relating to machine status information can be granted or withheld to users, as deemed appropriate for their user profile, intended use environment, or the like. In some implementations, access and permissions can be set such that particular users are allowed to control who else can use at least one machine, control the flow of jobs to at least one machine, or have the authority to cancel jobs sent by other users. In other implementations, some users can have control over who can see a given job, or select the machine they wish to operate. In another example implementation, access to machine status and machine life information can extend to the monitoring of general machine usage, including tracking of machine job cancellation logs, reported bugs or service history to, for example, aid in troubleshooting or diagnosing errors experienced by a given machine or network of machines.

In some implementations, users can be authorized to send jobs, but require an additional layer of authorization (e.g. from a machine operator) before machine processing is approved. Processing authorization may involve automated or non-automated review of information stored in or calculated by the machine. For instance, checking whether the user is exceeding the number of permitted executions for a given design, account, etc., or checking that the design to be machined is safe or appropriate given the selected materials or machine conditions.

Examples of settings that a super-user, administrator, and/or the like can configure can include settings that restrict use access to a certain material type (for example, use of approved materials that can be recognized by the machine only). Furthermore, for accounting and/or financial purposes, an administrators can track hours of use, the duration that the laser is on, time during which the user has requested exclusive use of the machine, accumulated wear and tear on components like the laser or air filters, and/or the like. In one example, users who are processing material such as acrylic that quickly dirties the air filter may be charged more than users who process paper, which has a lesser impact on the air filter. In another example, users who cut materials that produce an unpleasant odor or require more work to clean up might be charged more, based on the machine's identification of the material.

Furthermore, users can have different levels of access to particular machines, CNC user groups, or networks. For example, a single user's account can be governed by more a more restrictive set of permissions when using a library-owned CNC machine than when processing materials on their personal home CNC machine.

Administrative Accounts

In some implementations, users can be prevented from viewing content generated by other users. Examples of content can include designs, materials pre- or post-processing, finished jobs, interior images, image assemblies, and exterior images including exterior images where the other user is present in the image.

Other implementations of restricting shared environments can relate to the concept of time-based access; for example, use sessions that expire after a set period (e.g. use access expires after an hour, at a certain date or tied to particular milestones, such as project completion or student graduations). Another example of such time-based access can be implementation of scheduled access, for instance via a booking system that may have customizable governance rules concerning use. In other implementations involving of time-based access, the time of use of a CNC machine by a user can be tracked against some predefined hour budget, which upon being used up can prompt the user to refresh their budget automatically or by authorization.

Shared access to images of aspects of CNC machine processing may have utility in safety monitoring, where at least one camera of the CNC machine may be used to track a job throughout various stages of design planning, preparation and execution. In one such embodiment, at least one user may have the specified or unspecified ability to observe or monitor jobs from at least one CNC machine as a means of detecting and flagging problems with processing that may occur (for example, the detection of unusual levels of smoke and fumes). In another embodiment, operational efficiencies in high-use or resource-constrained spaces, and the like, may be gained via access to shared images or information. For example, sharing of information that conveys the length of time remaining on a given job, the specific user currently operating the machine, etc. may enhance the workflow efficiency and user experience.

During processing, a CNC machine can restrict users from planning future jobs. However, in some implementations, a user interface or "ghost mode" can allow a user to conduct activities such as plan, arrange, and preview future jobs, despite the desired CNC machine already being physically in use. The extent of functionality that can be available to the user during this mode can include all steps up until the point of the actual job initiation itself. In some cases, a new job can be merged with an active job, so the CNC machine will either perform them sequentially or interleave instructions for both. There can be a memory storage location such as memory or a disk on an internet-connected computer where multiple users trying to access at least one common CNC machine may securely "park" or store files that have been designated ready for execution, for example, once a suitable CNC machine becomes available, or when the requested machine becomes available. In some implementations, an operator can be responsible for the physical execution of stored jobs. The execution of all stored jobs within a given memory location may be governed by or optimized for the intended use setting. Jobs can be prioritized based on, for example, faster execution or calibration times, use of particular material types, received from premium users, the user having been granted or have purchased the rights to priority access, or the like. In one implementation, the operator may view all pending jobs, select the next job to execute, and commence execution. The operator may instead manage a queue that executes jobs in order, and optionally rearrange the queue or sort it by parameters such as job duration, time submitted, or the amount paid by the submitter. The operator may be capable of deleting individual jobs.

Figure 6A:
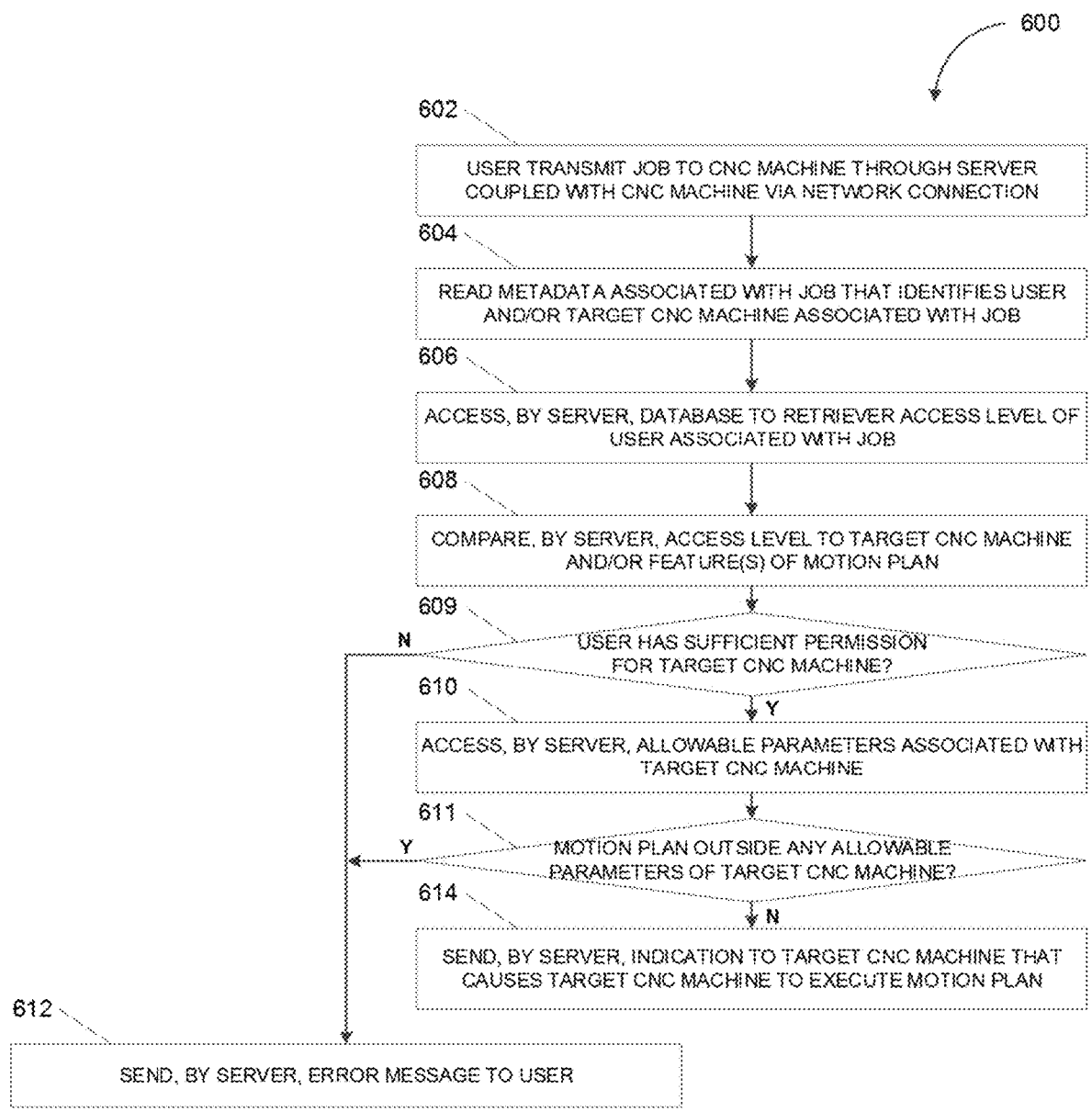
FIG. 6A is a flowchart illustrating a process for accessing a CNC machine, consistent with some implementations of the current subject matter.

FIG. 6A is a flowchart illustrating a process 600 for accessing a CNC machine, consistent with some implementations of the current subject matter. A user can transmit a job to the CNC machine through server that is coupled with the CNC machine via a network connection (602). Metadata can be read associated with the job that identifies a user and a target CNC machine associated with the job (604). The server can access a database to retrieve an access level of the user associated with the job (606). The server can compare the access level to the target CNC machine and/or one or more features of the motion plan (608). The server can determine whether the user has sufficient permissions for the target CNC machine (609). When the permissions are determined to be insufficient (609-N), the server can send an error message to the user (610). Alternatively and/or additionally, the server can determine that the user has sufficient permissions for the desired CNC machine (609-Y), in which case the server can access allowable parameters associated with the target CNC machine (612). The server can further determine whether the motion plan is outside any allowable CNC machine parameters including, for example, smoke, fire, resolution, and/or the like (611). When the motion plan is outside any allowable CNC machine parameters (611-Y), an error message can be sent to the user (610). Alternatively and/or additionally, if the motion is not outside of any allowable CNC machine parameters (611-N), the server can send, to the target CNC machine, indication that causes the target CNC machine to execute the motion plan (614).

Figure 6B:
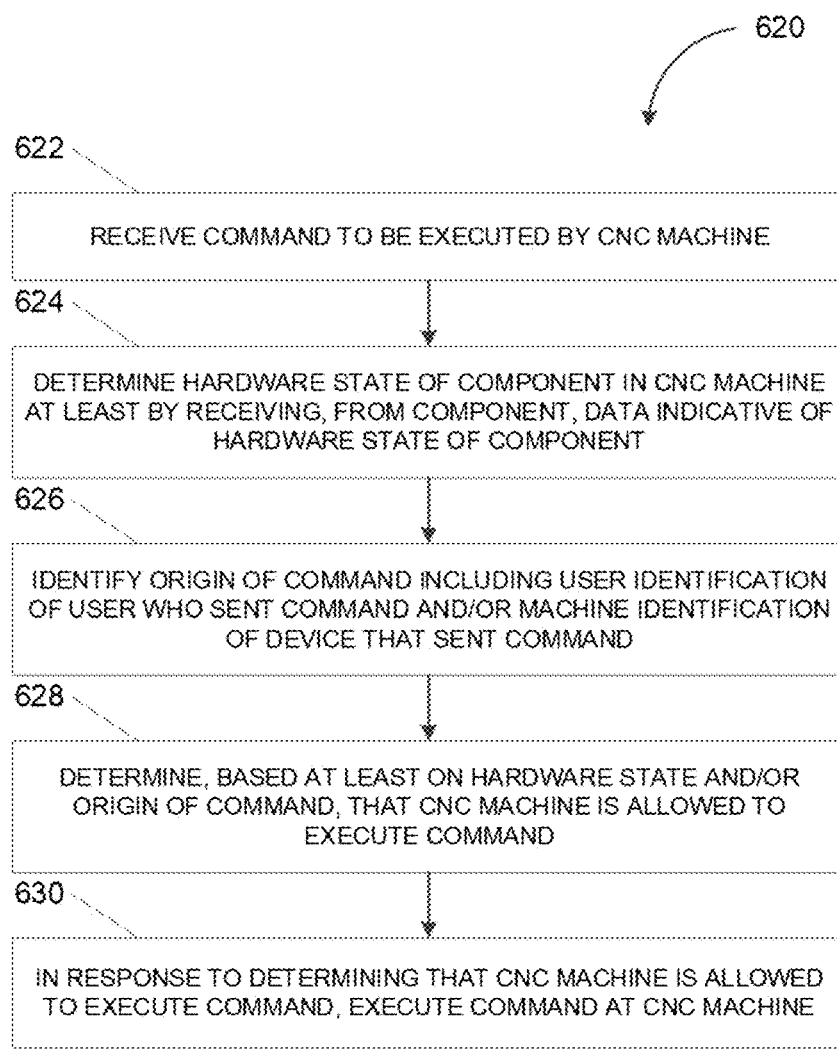
FIG. 6B is a flowchart illustrating a process for accessing a CNC machine, consistent with some implementations of the current subject matter.

FIG. 6B is a flowchart illustrating a process 620 for accessing a CNC machine, consistent with some implementations of the current subject matter. Referring to FIG. 6B, the process 600 can be performed at the CNC machine 100 and/or a device coupled with the CNC machine 100 such as, for example, the first computing systems 520.

The CNC machine 100 can receive a command to be executed by the CNC machine 100 (622). For example, in some implementations of the current subject matter, the CNC machine 100 can receive one or more commands for controlling the operations of the CNC machine 100 and/or accessing the CNC machine 100 including, for example, executing a job at the CNC machine 100, disabling the CNC machine 100 including interrupting one or more pending and/or executing jobs, accessing data generated by one or more components (e.g., sensors) in the CNC machine 100, and/or the like.

The CNC machine 100 can determine a hardware state of a component in the CNC machine at least by receiving, from the component, data indicative of the hardware state of the component (624). For example, the CNC machine 100 can determine whether an openable barrier (e.g., the lid 130 of the CNC machine 100) is in an open state and/or a closed state. Alternatively and/or additionally, the CNC machine 100 can determine whether the laser is on, a moveable component is in motion, a motor is running, a sensor detects certain conditions (e.g., gas), and/or the like.

The CNC machine 100 can identify an origin of the command including a user identification of a user who sent the command and/or a machine identification of a device that sent the command (626). For instance, in some implementations of the current subject matter, the CNC machine 100 can determine whether the command originated from a user and/or a device having full permissions (e.g, administrator permissions) and/or limited permissions (e.g., guest permissions).

The CNC machine 100 can determine that, based at least on the hardware state of the component and/or the origin of the command, the CNC machine 100 is allowed to execute the command (628). In some implementations of the current subject matter, the CNC machine 100 can impose restrictions based on hardware state and/or the origin of the command. That is, the CNC machine 100 may apply a set of rules that define, for instance, sensor permissions, job management permissions, and/or the like. For instance, the CNC machine 100 can apply sensor permissions that determines access to data collected by one or more sensors such as, for example, cameras, microphones, and/or any other device configured to capture data from the CNC machine 100 and/or its surroundings. Alternatively and/or additionally, the CNC machine 100 can apply job management permissions that determine which users are allowed to and/or prohibited from sending jobs to the CNC machine 100, observe who has submitted pending jobs, observe the contents of pending jobs, enable the CNC machine 100 to begin one or more jobs, submitting a job for approval by a different user before execution, and/or the like.

In response to determining that the CNC machine 100 is allowed to execute the command, execute the command at the CNC machine 100 (630). For example, in some implementations of the current subject matter, the CNC machine 100 may execute the command when the origin of the command and/or the hardware state at the CNC machine 100 are consistent with the set of rules.

Figure 6C:
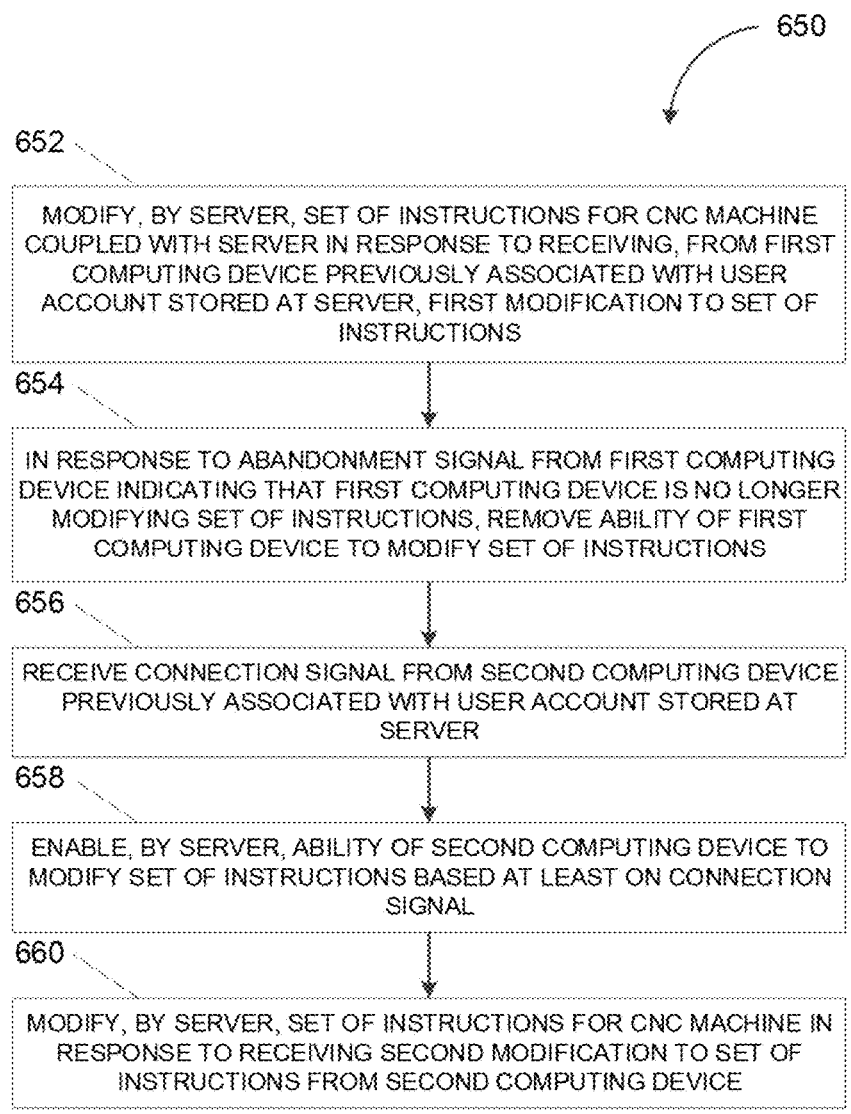
FIG. 6C is a flowchart illustrating a process for modifying instructions for a CNC machine, consistent with some implementations of the current subject matter.

FIG. 6C is a flowchart illustrating a process 650 for modifying instructions for the CNC machine 100, consistent with some implementations of the current subject matter. Referring to FIG. 6C, the process 650 can be performed at one or more devices (e.g., a server, a mainframe computer, and/or the like) communicatively coupled with the CNC machine 100 including, for example, the first computing system 520.

The first computing system 520 can modify a set of instructions for the CNC machine 100 in response to receiving, from a first computing device previously associated with a user account stored at the first computing system 520, a first modification to the set of instructions (652). In response to an abandonment signal from the first computing device indicating that the first computing device is no longer modifying the set of instructions, the first computing system 520 can remove an ability of the first computing device to modify the set of instructions (654). The first computing system 520 can receive a connection signal from a second computing device previously associated with the user account stored at the first computing system 520 (656). The first computing system 520 can enable an ability of the second computing device to modify the set of instructions based at least on the connection signal (658). The first computing system 520 can modify the set of instructions for the CNC machine 100 in response to receiving a second modification to the set of instructions from the second computing device (660).

Figure 7:
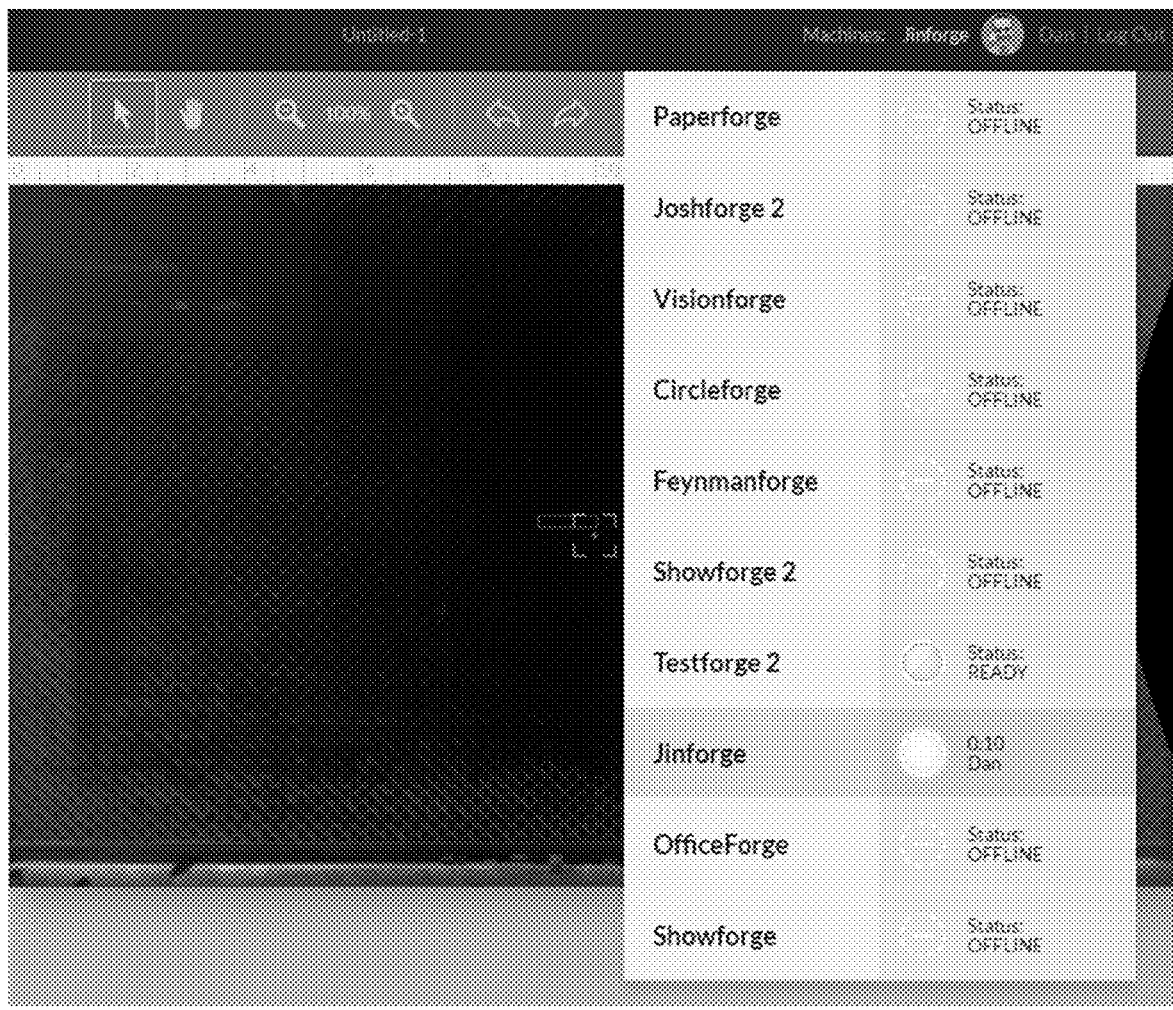
FIG. 7 is a diagram illustrating a graphical user interface displaying users and a status of a CNC machine associated with the users, consistent with some implementations of the current subject matter.

FIG. 7 is a diagram illustrating a graphical user interface displaying users and a status of a CNC machine associated with the users, consistent with some implementations of the current subject matter. In one example, a user has been granted access permissions to multiple machines. The user is permitted to see the state of those machines, specifically whether they are ready for usage, offline, or in the process of being used by another user. This can be accomplished by querying the user's permissions from a database and identifying which units they are permitted to access, querying the machines' state, and querying the active user and time remaining for any machine currently executing a job. Once a machine is selected, the user can, based on their permissions, be able to see images from the machine's camera, see if the door or lid is open, read the ambient temperature of the CNC machine, see error messages relating to the CNC machine, and other properties of the CNC machine.

Syncing Projects Across Users and Devices

In some implementations, the system (including a CNC machine networked to one or more computers) can be configured to communicate data pertaining to processing jobs through the cloud (or other network connection or data transfer means) across multiple users, devices and types of devices. Syncing of projects can extend across all stages of job design, material assembly or preview through to actual job execution. As an example, at least one user may design a job on a computer, then seamlessly switch to a tablet or mobile device to position the materials and design appropriately, before sending the job to the CNC machine for execution. Syncing can also extend to real-time knowledge of machine state—for example, users can elect to be notified when others users start using camera data for the purpose of setting up a job in order to be aware of future user intentions within the shared machining space. Other implementations can include the ability for users to improve upon designs already in existence and share and re-share the cumulatively built add-on modifications of others.

In other implementations, the data pertaining to the machining process can be stored on the server and tied to another object, for example the user account or the machine selected. The user accesses the data via a client (e.g. web browser or native application) and modifies the machining process, for example requesting slower execution speed to achieve a higher level of detail. The user then abandons the client and invokes a different client, which need not be the same type (for example beginning in a web browser and concluding in a native application). The new client can also be running on the same or a different machine. Since the user's modifications to the machining process are stored in the server, the new client can resume where the previous client left off, allowing the user to progress with the machining process. In one embodiment, the clients may have different functionality. In some implementations, the web client can have the ability to precisely position objects on screen, while the mobile client can simply have the ability to preview and halt or commence machining operations. In such implementations, any client that can access the APIs defined by the server, for example for authenticating users, modifying machining processes, and commencing or terminating machining processes, can be used interchangeably. In other embodiments, each modification to the machining process is displayed simultaneously on all clients, since all are receiving the data from the server simultaneously. In yet other implementations, when a client connects with certain information (e.g. authenticates as a user), a state pertaining to that information can be prohibited from modification or viewing by other clients. In other words, multiples users cannot access the machining process under modification at the same time.

Communication Across Users or User Groups

Multi-user networks may benefit from the ability to have personal chat, group chat, and/or chat bot functions between users that facilitate communications about such items as the scheduling of jobs, local or system-wide troubleshooting or problems, sharing of design ideas or inspirations, or other communication in real-time. In one example, users who share a common characteristic, for example access to a specific machine, are able to exchange text, image, or other multimedia information with each other. Permissions to the machine can implicitly grant permissions to communicate. This can be used, for example, to coordinate access to a machine between colleagues who are communicating in real-time.

In various implementations of the current subject matter, a method for accessing a CNC machine can include: receiving, at the CNC machine comprising a laser configured to deliver electromagnetic energy to effect a change in a material within an interior space of the CNC machine, a command to be executed by the CNC machine; determining a hardware state of a component in the CNC machine by at least receiving, from the component, data indicative of the hardware state; identifying an origin of the command, the origin of the command comprising a user identification of a user who sent the command and/or a machine identification of a device that sent the command; determining, based at least on the hardware state of the component and/or the origin of the command, that the command is allowed to be executed by the CNC machine, the determining comprising applying a set of rules defining when the CNC machine is allowed to execute the command; and in response to determining that the CNC machine is allowed to execute the command, executing the command at the CNC machine.

Permissions including an administrator-level permission and/or a lower-level permission can be defined at a device configured to communicate with the CNC machine. The administrator-level permission can include an ability to modify the command based at least on the origin of the command being associated with the lower-level permission. An owner of a job can be defined at a device configured to communicate with the CNC machine. The job can include instructions for at least partially executing a motion plan at the CNC machine. The component in the CNC machine can include a sensor configured to capture data from the CNC machine. The command can include a request to transmit, to the device, at least a portion of the data captured by the sensor.

The CNC machine can be configured to execute a job comprising executing at least a portion of a motion plan. The job can be associated with a completion state defined by at least the completion of the motion plan. The command is not allowed to be executed by the CNC machine when the origin of the command is associated with a lower-level permission unless the origin of the command is an owner of the job and the job is completed according to the completion state. The command is not allowed to be executed unless a material being operated on by the CNC machine is removed from the CNC machine.

A graphical representation of at least one of a material in the computer-numerically-controlled machine, a current user of the computer-numerically-controlled machine, a status of the computer-numerically-controlled machine, a remaining time of a job being executed by the computer-numerically-controlled machine, a waiting user scheduled to use the computer-numerically-controlled machine, a delay time between consecutive uses of the computer-numerically-controlled machine, and a schedule of jobs queued to be executed by the computer-numerically-controlled machine can be displayed at a display device.

The command is not allowed to be executed by the CNC machine based at least on a type of a material associated with the command. The type of the material can be verified at least by analyzing an image of the material acquired from at least sensor operatively connected to the CNC machine and comparing the image to a library of known material types that are permitted for use in the CNC machine.

The set of rules can include one or more operation limits of the CNC machine. The command is not allowed to be executed by the CNC machine based at least on the command being associated with a motion plan that conflicts with the set of rules. Alternatively and/or additionally, the command is not allowed to be executed by the CNC machine based at least on the user who sent the command being locked out of the CNC machine.

The CNC machine can be disabled in response to the command being a disable command and a determination that the CNC machine is allowed to execute the disable command. The disabling can include at least one of immediately shutting down at least the laser and shutting down the computer-numerically-controlled machine according to a pre-programmed sequence that minimizes a difference in an appearance of a finished work-product relative to an appearance of the finished work-product machined without a shutdown.

In various implementations of the current subject matter, a method for modifying instructions for a CNC machine may include: modifying a set of instructions for the CNC machine in response to receiving, at a server and from a first computing device, a first modification to the set of instructions, the first computing device previously associated with a user account stored at the server; in response to an abandonment signal received at the server and from the first computing device, removing an ability of the first computing device to modify the set of instructions, the abandonment signal indicating that the first computing device is no longer modifying the set of instructions; enabling an ability of a second computing device to modify the set of instructions, the enabling based at least on a connection signal received at the server from the second computing device, the second computing device previously associated with the user account stored at the server; and modifying the set of instructions for the CNC machine in response to receiving, at the server from the second computing device, a second modification to the set of instructions.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method carried out by a computing system, the method comprising:
   modifying an instruction set for a computer-numerically-controlled (CNC) machine after receipt of a first modification to the instruction set from a first application executing on a first computing device, wherein the instruction set is executable to control one or more components of the CNC machine; and
   while the instruction set is being executed:
      removing, after receipt at the computing system of an abandonment signal from the first application, an ability of the first application to modify the instruction set, the abandonment signal indicating that the first application is no longer modifying the instruction set;
      enabling, after receipt at the computing system of a connection signal from a second application, an ability of the second application to modify the instruction set; and
      modifying the instruction set after receipt at the computing system of a second modification to the instruction set from the second application.

2. The method of claim 1, wherein the CNC machine comprises a sensor configured to capture data from the CNC machine, and wherein the connection signal comprises a request to transmit, to the first computing device, at least a portion of the data captured by the sensor.

3. The method of claim 1, further comprising displaying, at a display device, a graphical representation of at least one of a material in the CNC machine, a current user of the CNC machine, a status of the CNC machine, a remaining time of a job being executed by the CNC machine, a waiting user scheduled to use the CNC machine, a delay time between consecutive uses of the CNC machine, and a schedule of jobs queued to be executed by the CNC machine.

4. The method of claim 1, wherein the first application and the second application were previously associated with a same user account at the computing system.

5. The method of claim 4, wherein a user associated with the same user account first modifies the instruction set associated with a machining process via the first application, and later invokes the second application to resume the machining process which has been abandoned by the first application.

6. The method of claim 1, wherein the second application executes on a second computing device.

7. The method of claim 1, further comprising prohibiting a second user associated with a second user account logged into the second application from viewing a result of or modifying the instruction set while a first user associated with a first user account logged into the first application is connected to the CNC machine.

8. A computing system comprising:
   at least one processor;
   non-transitory computer-readable medium; and
   program instructions stored on the non-transitory computer-readable medium that are executable by the at least one processor such that the computing system is configured to perform operations comprising:
      modifying an instruction set for a CNC machine after receipt of a first modification to the instruction set from a first application executing on a first computing device, wherein the instruction set is executable to control one or more components of the CNC machine; and while the instruction set is being executed:

removing, after receipt at the computing system of an abandonment signal from the first application, an ability of the first application to modify the instruction set, the abandonment signal indicating that the first application is no longer modifying the instruction set;

enabling, after receipt at the computing system of a connection signal from a second application, an ability of the second application to modify the instruction set; and modifying the instruction set after receipt at the computing system of a second modification to the instruction set from the second application.

9. The computing system of claim 8, wherein the first application and the second application were previously associated with a same user account at the computing system.

10. The computing system of claim 8, further comprising: the CNC machine.

11. The computing system of claim 8, further comprising program instructions stored on the non-transitory computer-readable medium that are executable by the at least one processor such that the computing system is configured to perform operations comprising:

transmitting the instruction set to the CNC machine.

12. A non-transitory computer-readable medium, wherein the non-transitory computer-readable medium is provisioned with program instructions that, when executed by at least one processor, cause a computing system to perform operations comprising:

modifying an instruction set for a CNC machine after receipt of a first modification to the instruction set from a first application executing on a first computing device, wherein the instruction set is executable to control one or more components of the CNC machine; and while the instruction set is being executed:

removing, after receipt at the computing system of an abandonment signal from the first application, an ability of the first application to modify the instruction set, the abandonment signal indicating that the first application is no longer modifying the instruction set;

enabling, after receipt at the computing system of a connection signal from a second application, an ability of the second application to modify the instruction set; and modifying the instruction set after receipt at the computing system of a second modification to the instruction set from the second application.

13. The non-transitory computer-readable medium of claim 12, wherein the CNC machine comprises a sensor configured to capture data from the CNC machine, and wherein the connection signal comprises a request to transmit, to the first computing device, at least a portion of the data captured by the sensor.

14. The non-transitory computer-readable medium of claim 12, further comprising displaying, at a display device, a graphical representation of at least one of a material in the CNC machine, a current user of the CNC machine, a status of the CNC machine, a remaining time of a job being executed by the CNC machine, a waiting user scheduled to use the CNC machine, a delay time between consecutive uses of the CNC machine, and a schedule of jobs queued to be executed by the CNC machine.

15. The non-transitory computer-readable medium of claim 12, wherein the first application and the second application were previously associated with a same user account at the computing system.

16. The non-transitory computer-readable medium of claim 15, wherein a user associated with the same user account first modifies the instruction set associated with a machining process via the first application, and later invokes the second application to resume the machining process which has been abandoned by the first application.

17. The non-transitory computer-readable medium of claim 12, wherein the second application executes on a second computing device.

18. The non-transitory computer-readable medium of claim 12, wherein the first application and the second application provide different functionality.

19. The non-transitory computer-readable medium of claim 18, wherein the first application provides first functionality comprising an ability to modify a design, and the second application provides second functionality comprising previewing, halting or commencing machine operations.

20. The non-transitory computer-readable medium of claim 12, wherein the operations further comprise prohibiting a second user associated with a second user account logged into the second application from viewing a result of or modifying the instruction set while a first user associated with a first user account logged into the first application is connected to the CNC machine.

* * * * *